US012650659B2

(12) United States Patent
Fujiwara et al.

(10) Patent No.: US 12,650,659 B2
(45) Date of Patent: Jun. 9, 2026

(54) SHEET-SHAPED SEALING MEMBER, REMOVABLE UNIT, AND IMAGE FORMING APPARATUS

(71) Applicants: Hiroshi Fujiwara, Kanagawa (JP); Kazuki Matsumoto, Kanagawa (JP); Hiroshi Hosokawa, Kanagawa (JP); Osamu Saito, Kanagawa (JP)

(72) Inventors: Hiroshi Fujiwara, Kanagawa (JP); Kazuki Matsumoto, Kanagawa (JP); Hiroshi Hosokawa, Kanagawa (JP); Osamu Saito, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 19/011,653

(22) Filed: Jan. 7, 2025

(65) Prior Publication Data

US 2025/0231505 A1 Jul. 17, 2025

(30) Foreign Application Priority Data

Jan. 12, 2024 (JP) ................................. 2024-003137

(51) Int. Cl.

| | |
|---|---|
| ***G03G 15/08*** | (2006.01) |
| ***G03G 21/16*** | (2006.01) |
| ***G03G 21/18*** | (2006.01) |

(52) U.S. Cl.

CPC ..... *G03G 15/0882* (2013.01); *G03G 21/1633* (2013.01); *G03G 21/181* (2013.01); *G03G 21/1814* (2013.01); *G03G 21/1839* (2013.01); *G03G 2215/088* (2013.01)

(58) Field of Classification Search

CPC ........... G03G 15/0882; G03G 21/1633; G03G 21/181; G03G 21/1814; G03G 21/1839; G03G 2215/088; G03G 15/0881

See application file for complete search history.

(56) References Cited

U.S. PATENT DOCUMENTS

| | | | | |
|---|---|---|---|---|
| 6,044,238 | A * | 3/2000 | Rodriguez ......... | G03G 15/0882 399/119 |
| 2005/0249519 | A1 * | 11/2005 | Chadez .............. | G03G 15/0882 399/106 |
| 2016/0170328 | A1 | 6/2016 | Hosokawa et al. | |
| 2017/0146925 | A1 | 5/2017 | Tsuji et al. | |
| 2018/0356748 | A1 | 12/2018 | Matsumoto et al. | |
| 2018/0364620 | A1 | 12/2018 | Kubota et al. | |
| 2019/0033749 | A1 | 1/2019 | Tamaki et al. | |
| 2020/0166886 | A1 | 5/2020 | Saito et al. | |
| 2022/0091556 | A1 | 3/2022 | Shimizu et al. | |

FOREIGN PATENT DOCUMENTS

| | | |
|---|---|---|
| JP | 2016-167010 A | 9/2016 |

* cited by examiner

*Primary Examiner* — Sandra Brase

(74) *Attorney, Agent, or Firm* — XSENSUS LLP

(57) ABSTRACT

A sheet-shaped sealing member to be pulled out from a front side of the sheet-shaped sealing member in a pull-out direction that is a longitudinal direction of the sheet-shaped sealing member includes a sealing portion and a cutout portion. The sealing portion seals a sealed portion. The cutout portion is cut out to be cantilevered with a position different from the sealing portion as a root portion. The cutout portion has a free end as a fixing portion to be removably fixed to the sealed portion or a fixed portion of a housing in which the sheet-shaped sealing member is installed.

19 Claims, 6 Drawing Sheets

SHEET-SHAPED SEALING MEMBER, REMOVABLE UNIT, AND IMAGE FORMING APPARATUS

CROSS-REFERENCE TO RELATED APPLICATION

This patent application is based on and claims priority pursuant to 35 U.S.C. § 119 (a) to Japanese Patent Application No. 2024-003137, filed on Jan. 12, 2024, in the Japan Patent Office, the entire disclosure of which is hereby incorporated by reference herein.

BACKGROUND

Technical Field

Embodiments of the present disclosure relate to a sheet-shaped sealing member that can be pulled out from the front side in a longitudinal direction as a pull-out direction, a removable unit such as a process cartridge and a developing device, and an image forming apparatus such as a copier, a printer, a facsimile machine, or a multifunction peripheral thereof, which include the sheet-shaped sealing member.

Related Art

In a removable unit such as a process cartridge or a developing device installed in an image forming apparatus such as a copier or a printer from the time of shipment, a technology is known in which a sheet-shaped sealing member is installed to seal an opening for allowing powder to flow into or out of the removable unit so that the powder such as toner stored inside does not leak from the removable unit during transportation after the shipment from a factory.

SUMMARY

In an embodiment of the present disclosure, a sheet-shaped sealing member to be pulled out from a front side of the sheet-shaped sealing member in a pull-out direction that is a longitudinal direction of the sheet-shaped sealing member includes a sealing portion and a cutout portion. The sealing portion seals a sealed portion. The cutout portion is cut out to be cantilevered with a position different from the sealing portion as a root portion. The cutout portion has a free end as a fixing portion to be removably fixed to the sealed portion or a fixed portion of a housing in which the sheet-shaped sealing member is installed.

In another embodiment of the present disclosure, a removable unit detachably attachable to a body of an image forming apparatus includes the housing and the sheet-shaped sealing member removably installed in the housing.

In still another embodiment of the present disclosure, an image forming apparatus includes a body. The body includes a cover that opens and closes for attachment and detachment of the removable unit to and from the body. The sheet-shaped sealing member includes a grip portion on a front side in a pull-out direction. The grip portion is exposed to an outside of the body of the image forming apparatus to be pulled out in a state where the cover is closed or is exposed to the outside of the body of the image forming apparatus to be pulled out in a state where the cover is open.

In still yet another embodiment of the present disclosure, a sheet-shaped sealing member includes a base, a cutout portion, and a sealing portion. The base has an elongated sheet shape. The cutout portion is disposed on the base and cut out to be cantilevered with one end in a longitudinal direction of the sheet-shaped sealing member as a root portion and another end in the longitudinal direction as a free end. The cutout portion has a fixing portion on one surface of the free end. The sealing portion is disposed on an end of the base opposite the free end in the longitudinal direction with respect to the root portion and on a surface of the base opposite a surface on which the fixing portion is disposed.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
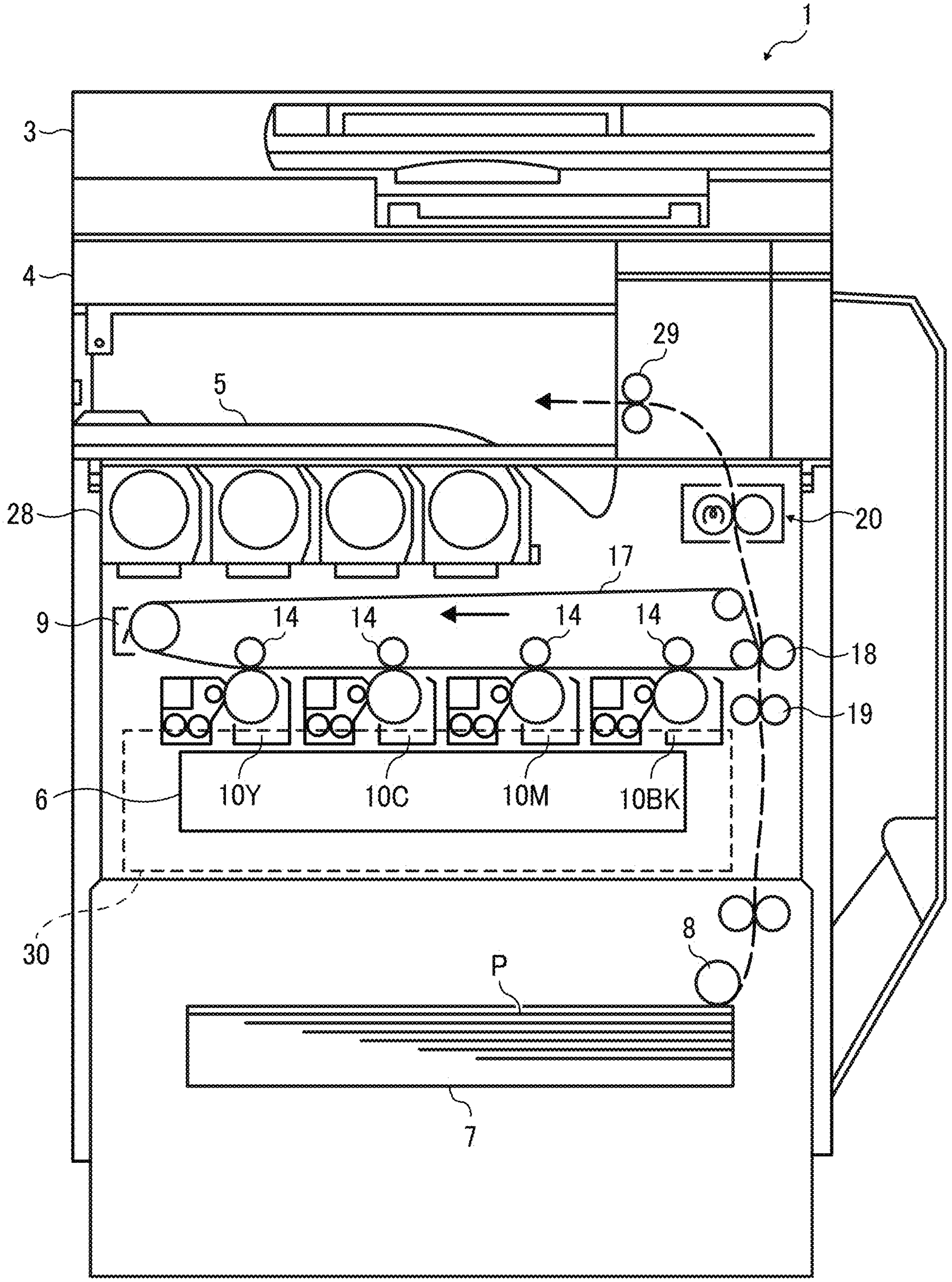
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. Like reference signs are assigned to like elements or components and descriptions of those elements or components may be simplified or omitted. As used herein, the singular forms "a," "an," and "the" are intended to include the plural forms as well, unless the context clearly indicates otherwise.

A description is given of an overall configuration and operation of an image forming apparatus 1 below with reference to FIG. 1. In FIG. 1, the image forming apparatus 1, which is illustrated as a color copier in the present embodiment, includes a document conveying device 3, a scanner 4 (document reading device), and a writing device 6 (exposure device). The document conveying device 3 conveys documents to the scanner 4. The scanner 4 scans the documents to read image data. The writing device 6 emits a laser beam based on input image data. The image forming apparatus 1 also includes a sheet feeder 7, process cartridges 10Y, 10M, 10C, and 10BK (removable units), an intermediate transfer belt 17, and a secondary transfer roller 18. The sheet feeder 7 stores sheets P such as sheets of paper. The process cartridges 10Y, 10M, 10C, and 10BK are image forming devices to form toner images of yellow, magenta, cyan, and black, respectively. The toner images of multiple colors are transferred and superimposed one on another onto the intermediate transfer belt 17. The secondary transfer roller 18 transfers the toner images on the intermediate transfer belt 17 onto the sheet P. The image forming apparatus 1 further includes a fixing device 20, toner containers 28, and a waste-toner collection container 30. The fixing device 20 fixes unfixed toner images on the sheet P. The toner containers 28 contain toners of respective colors to be supplied to developing devices 13 of the corresponding process cartridges 10Y, 10M, 10C, and 10BK (the removable units). Waste-toner is collected in the waste-toner collection container 30.

Figure 2:
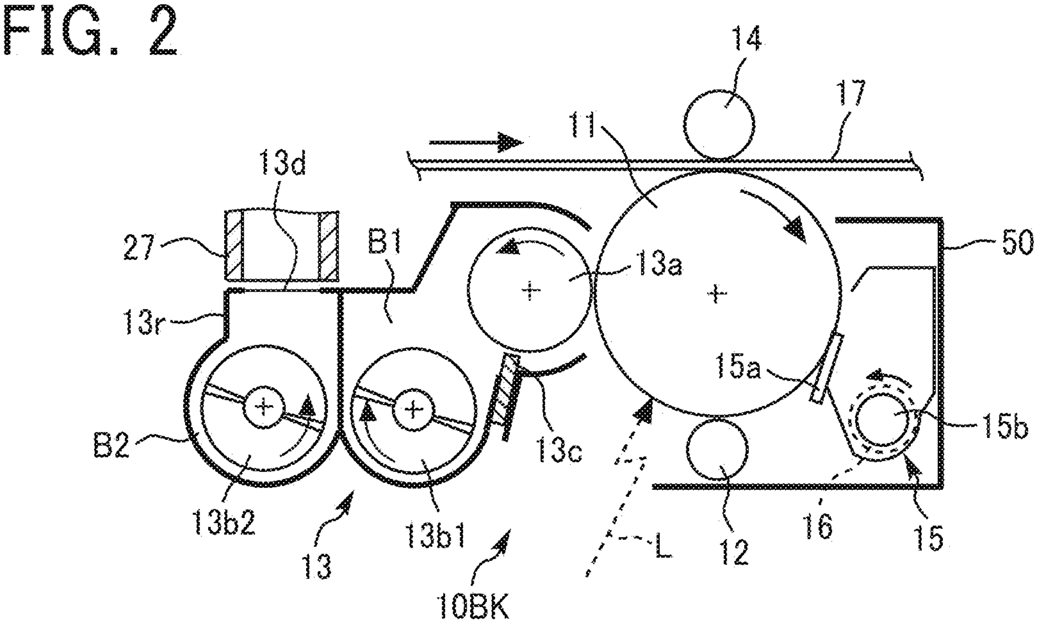
FIG. 2 is a schematic view of an image forming device of the image forming apparatus in FIG. 1.

Each of the process cartridges 10Y, 10M, 10C, and 10BK (serving as image forming devices) includes a photoconductor drum 11 (serving as an image bearer), a cleaner, the developing device 13, and a cleaning device 15, which are united as a single unit as illustrated in FIG. 2, and is detachably attached with respect to a body of the image forming apparatus 1. Each of the process cartridges 10Y, 10M, 10C, and 10BK, which is expendable, is replaced with a new one when depleted. Yellow, magenta, cyan, and black toner images are formed on the respective photoconductor drums 11 (serving as image bearers) in the process cartridges 10Y, 10M, 10C, and 10BK.

A description is given below of operations of the image forming apparatus 1 to form a normal color toner image. Conveying rollers of the document conveying device 3 convey a document on a document table onto an exposure glass of the scanner 4. The scanner 4 optically scans the document on the exposure glass to read image data. The yellow, magenta, cyan, and black image data are transmitted to the writing device 6. The writing device 6 irradiates the photoconductor drums 11 of the corresponding process cartridges 10Y, 10M, 10C, and 10BK with laser beams L (exposure light) based on the yellow, magenta, cyan, and black image data, respectively.

Meanwhile, the four photoconductor drums 11 rotate clockwise as illustrated in FIGS. 1 and 2. With reference to FIG. 2, a charging device 12 (a charging roller) uniformly charges a surface of the photoconductor drum 11 at a position opposite the photoconductor drum 11 (charging process). Thus, the surface of the photoconductor drum 11 is charged to a certain potential. Subsequently, the surface of the photoconductor drum 11 thus charged reaches a position where the surface of the photoconductor drum 11 is irradiated with the laser beam L. The writing device 6 emits the laser beams L for respective colors from a light source according to the image data of respective colors. The laser beams L are reflected by a polygon mirror and transmitted through multiple lenses. The laser beams L transmitted through the multiple lenses passes through different optical passages for the different color components of yellow, magenta, cyan, and black (exposure process).

The laser beam L corresponding to the yellow image data is emitted to the surface of the photoconductor drum 11 in the first process cartridge 10Y from the left among the four process cartridges 10Y, 10M, 10C, and 10BK in FIG. 1. Thus, an electrostatic latent image for yellow is formed on the photoconductor drum 11 charged by the charging device 12. Similarly, the laser beam L corresponding to the cyan image data is emitted to the surface of the photoconductor drum 11 in the second process cartridge 10C from the left in FIG. 1, thus forming an electrostatic latent image corresponding to the cyan image data on the surface of the photoconductor drum 11. The laser beam L corresponding to the magenta image data is emitted to the surface of the photoconductor drum 11 in the third process cartridge 10M from the left in FIG. 1, thus forming an electrostatic latent image corresponding to the magenta image data on the surface of the photoconductor drum 11. The laser beam L corresponding to black image data is emitted to the surface of the photoconductor drum 11 in the fourth process cartridge 10BK from the left in FIG. 1, thus forming an electrostatic latent image corresponding to the black image data on the surface of the photoconductor drum 11.

Then, the surface of the photoconductor drum 11 bearing the electrostatic latent image for each color reaches the position opposite the developing device 13 (see FIG. 2). The developing device 13 supplies toner of each color onto the surface of the photoconductor drum 11 and develops the electrostatic latent image on the photoconductor drum 11 into a toner image (development process). Subsequently, the surface of the photoconductor drum 11 after the development process reaches a position opposite the intermediate transfer belt 17 (intermediate transferor) as image bearer. Each of primary transfer rollers 14 is disposed at the position where the surface of the photoconductor drum 11 faces the intermediate transfer belt 17 such that the primary transfer roller 14 contacts an inner circumferential surface of the intermediate transfer belt 17. At the positions of the primary transfer rollers 14, the toner images on the photoconductor drums 11 are sequentially transferred and superimposed onto the intermediate transfer belt 17, forming a multicolor toner image thereon (primary transfer process).

After the primary transfer process, the surface of the photoconductor drum 11 reaches the position opposite the cleaning device 15 (see FIG. 2). The cleaning device 15 collects untransferred toner remaining on the photoconductor drum 11 (cleaning process). The untransferred toner collected in the cleaning device 15 is conveyed in a conveyance tube 16 by a conveying screw 15*b* (see FIG. 2) and is collected as waste toner in the waste-toner collection container 30. Then, the surface of the photoconductor drum 11 passes through a charge elimination device to complete a series of image forming processes performed on the photoconductor drum 11.

Meanwhile, the surface of the intermediate transfer belt 17, onto which the single-color toner images on the photoconductor drums 11 are transferred and superimposed, moves in a direction indicated by an arrow in FIG. 1 and reaches a position opposite a secondary transfer roller 18. The secondary transfer roller 18 secondarily transfers the multicolor toner image on the intermediate transfer belt 17 onto the sheet P (secondary transfer process). After the secondary transfer process, the surface of the intermediate transfer belt 17 reaches a position opposite an intermediate transfer belt cleaner 9 (a cleaning device for the intermediate transfer belt 17). The intermediate transfer belt cleaner 9 collects the untransferred toner on the intermediate transfer belt 17 to complete a series of transfer processes on the intermediate transfer belt 17. The untransferred toner collected in the intermediate transfer belt cleaner 9 is conveyed in the conveyance tube 16 by the conveying screw 15*b* (see FIG. 2) and is collected as waste toner in the waste-toner collection container 30.

The sheet P is conveyed from the sheet feeder 7 to the position of the secondary transfer roller 18 via, for example, a sheet conveyance guide and a registration roller pair 19. More specifically, a feed roller 8 feeds the sheet P from the sheet feeder 7 that stores a stack of sheets P, and the sheet P is then guided by the sheet conveyance guide to the registration roller pair 19. The sheet P that has reached the registration roller pair 19 is conveyed toward the position of the secondary transfer roller 18 so that the sheet P coincides with the arrival of the multicolor toner image on the intermediate transfer belt 17.

Subsequently, the sheet P, onto which the multicolor image is transferred, is conveyed to a fixing device 20. The fixing device 20 includes a fixing roller and a pressure roller pressing against each other. In a nip between the fixing roller and the pressure roller, the multicolor toner image is fixed on the sheet P. After the fixing process, an output roller pair 29 ejects the sheet P as an output image outside the body of the image forming apparatus 1. The ejected sheets P are stacked on an output unit 5. Thus, a series of image forming processes is completed.

Next, a description is given in detail below of image forming devices of the image forming apparatus. FIG. 2 is a schematic view of the process cartridge 10BK (removable unit) for black. The other three process cartridges 10Y, 10M, and 10C (removable unit) have a similar configuration as the process cartridge 10BK for black except for the color of toner used in the image forming process, and thus drawings and descriptions thereof are omitted to avoid redundancy.

As illustrated in FIG. 2, the process cartridge 10BK as the removable unit includes the photoconductor drum 11 as the image bearer, the developing device 13, the charging device 12, and the cleaning device 15, which are stored in a cartridge casing 50 (a housing) as a single unit. The cleaning device 15 includes a cleaning blade 15*a* and the conveying screw 15*b* that contact the photoconductor drum 11.

The developing device 13 includes a developing roller 13*a* (serving as a developer bearer) disposed opposite the photoconductor drum 11 to form a developing area, a first conveying screw 13*b*1 (serving as a first conveyor) disposed opposite the developing roller 13*a*, a partition 13*e*, a second conveying screw 13*b*2 (serving as a second conveyor) disposed opposite the first conveying screw 13*b*1 via the partition 13*e*, and a doctor blade 13*c* (serving as a developer regulator) disposed opposite the developing roller 13*a* to regulate the amount of developer borne on the developing roller 13*a*.

Figure 3:
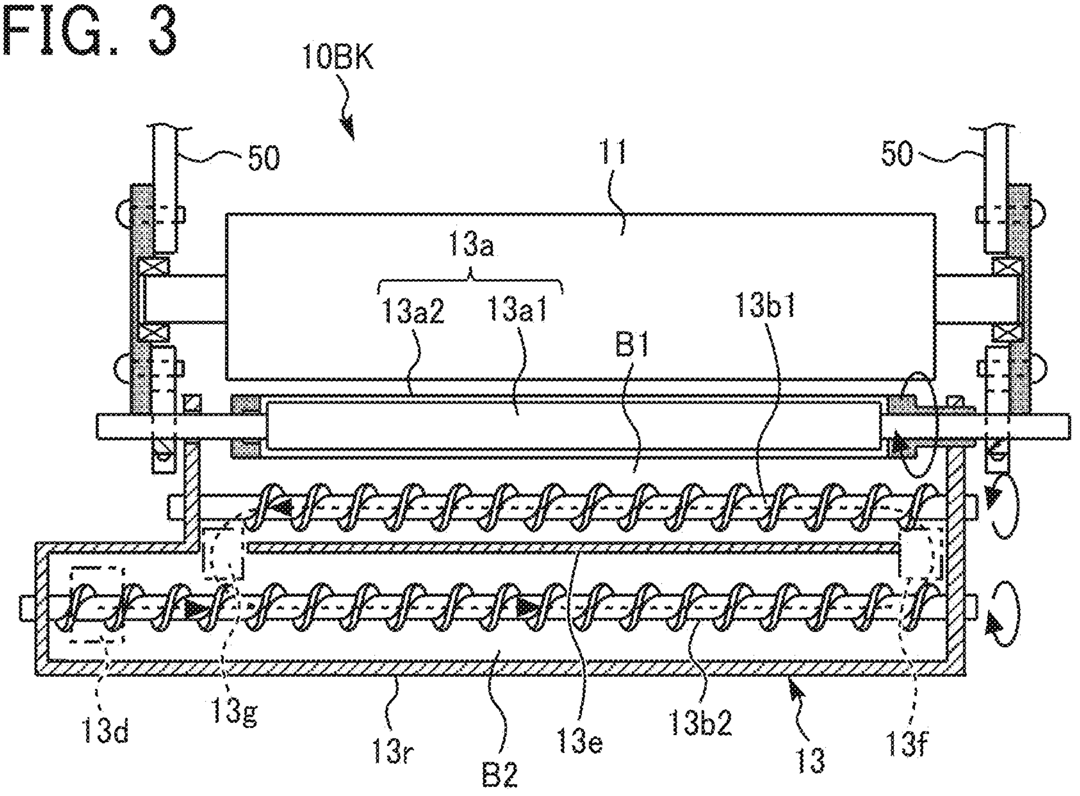
FIG. 3 is a sectional view of a main part of a process cartridge, cut along a longitudinal direction of the process cartridge.

The developing device 13 stores two-component developer including toner and carrier. The developing roller 13*a* faces the photoconductor drum 11 with a small gap, thereby forming a developing area. As illustrated in FIG. 3, the developing roller 13*a* includes a magnet 13*a*1 secured inside and a sleeve 13*a*2 that rotates around the magnet 13*a*1.

The magnet 13*a*1 generates multiple poles (magnetic poles) around an outer circumferential surface of the developing roller 13*a*.

The conveying screws 13*b*1 and 13*b*2 (serving as conveyors) convey the developer stored in the developing device 13 in the longitudinal direction of the developing device 13, thereby forming a circulation passage indicated by the dashed arrow in FIG. 3. In other words, the circulation path of the developer includes a first conveyance path B1 with the first conveying screw 13*b*1 and a second conveyance path B2 with the second conveying screw 13*b*2. The partition 13*e* is an inner wall and separates the first conveyance passage B1 from the second conveyance passage B2. The first conveyance passage B1 and the second conveyance passage B2 communicate with each other via a first communication opening 13*f* and a second communication opening 13*g* disposed at both longitudinal ends of the first conveyance passage B1 and the second conveyance passage B2. Specifically, with reference to FIG. 3, an upstream end of the first conveyance passage B1 in a conveyance direction of the developer communicates with a downstream end of the second conveyance passage B2 in the conveyance direction via the first communication opening 13*f*. On the other hand, a downstream end of the first conveyance passage B1 in the conveyance direction communicates with an upstream end of the second conveyance passage B2 in the conveyance direction via the second communication opening 13*g*. In other words, the partition 13*e* is disposed along the circulation passage except both longitudinal ends of the circulation passage. The first conveying screw 13*b*1 (or the first conveyance passage B1) is disposed to face the developing roller 13*a*. The second conveying screw 13*b*2 (or the second conveyance passage B2) is disposed to face the first conveying screw 13*b*1 (or the first conveyance passage B1) via the partition 13*e*. The first conveying screw 13*b*1 supplies developer toward the developing roller 13*a* and collects the developer separated from the developing roller 13*a* after the development process while conveying the developer in the longitudinal direction of the developing device 13. The second conveying screw 13*b*2 stirs and mixes the developer after the development process conveyed from the first conveyance passage B1 with fresh developer supplied from a toner supply inlet 13*d* while conveying the developer and the fresh developer in the longitudinal direction of the developing device 13. In the present embodiment, the first conveying screw 13*b*1 and the second conveying screw 13*b*2 (conveyors) are horizontally arranged in parallel. Each of the first conveying screw 13*b*1 and the second conveying screw 13*b*2 includes a shaft and a screw blade wound around the shaft.

A description is given in further detail of the image forming processes described above, focusing on the development process. The developing roller 13*a* rotates in the direction indicated by an arrow in FIG. 2. As illustrated in FIG. 3, the first conveying screw 13*b*1 and the second conveying screw 13*b*2 are disposed with the partition 13*e* interposed therebetween and rotate in the directions indicated by arrows in FIGS. 2 and 3. Toner is supplied from a toner container 28 to the toner supply inlet 13*d* (an inlet port) through a toner supply passage via a toner discharge port 27. As the first conveying screw 13*b*1 and the second conveying screw 13*b*2 rotate in the respective directions in FIG. 2, the developer stored in the developing device 13 circulates together with the supplied toner in the longitudinal direction of the developing device 13 (i.e., the direction indicated by the dashed arrow in FIG. 3) while being stirred and mixed with the supplied toner. The toner supply inlet 13*d* of the developing device 13 communicates with and is released from the toner discharge port 27 of the toner supply passage of the body of the image forming apparatus 1 in conjunction with the attachment or detachment operation of the developing device 13 (i.e., the process cartridge 10BK) with respect to the body of the image forming apparatus 1.

The toner is charged by friction with carrier in the developer and electrostatically attracted to carrier. Then, the toner is scooped up onto the developing roller 13*a* together with carrier by a developer scooping pole generated on the developing roller 13*a*. The developer borne on the developing roller 13*a* is conveyed in the counterclockwise direction indicated by the arrow in FIG. 2 to a position opposite the doctor blade 13*c*. The doctor blade 13*c* adjusts the amount of the developer on the developing roller 13*a* to a proper amount at the position. Subsequently, the rotation of the sleeve 13*a*2 conveys the developer to a developing area in which the developing roller 13*a* faces the photoconductor drum 11. Then, the toner in the developer is attracted to the electrostatic latent image formed on the photoconductor drum 11 due to the effect of an electric field generated in the developing area. As the sleeve 13*a*2 rotates, the developer remaining on the developing roller 13*a* reaches above the first conveyance passage B1 and is separated from the developing roller 13*a*. The electric field in the developing area is generated by a specified voltage (i.e., a development bias) applied to the developing roller 13*a* by a development power supply and a surface potential (i.e., a latent image potential) formed on the surface of the photoconductor drum 11 in the charging process and the exposure process.

The toner in the toner container 28 is supplied through the toner supply inlet 13*d* into the developing device 13 as the toner in the developing device 13 is consumed. The toner consumption in the developing device 13 is detected by a toner concentration sensor that magnetically detects a toner concentration in the developer (i.e., a ratio of toner to the developer) in the developing device 13. The toner supply inlet 13*d* is disposed above an end of the second conveying screw 13*b*2 (the second conveyance passage B2) in the longitudinal direction (the left-and-right direction in FIG. 3).

Figure 4A:
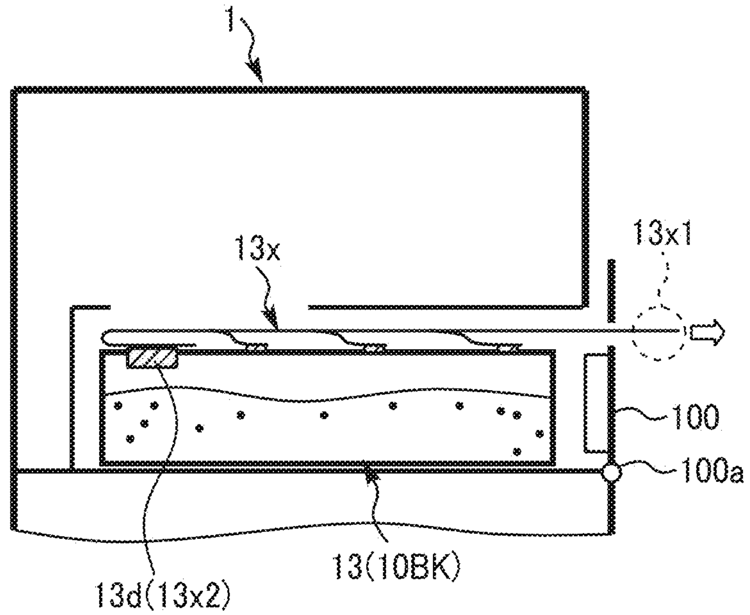
FIGS. 4A and 4B are diagrams illustrating a state in which a process cartridge is mounted to an image forming apparatus at the time of shipment.
Figure 4B:
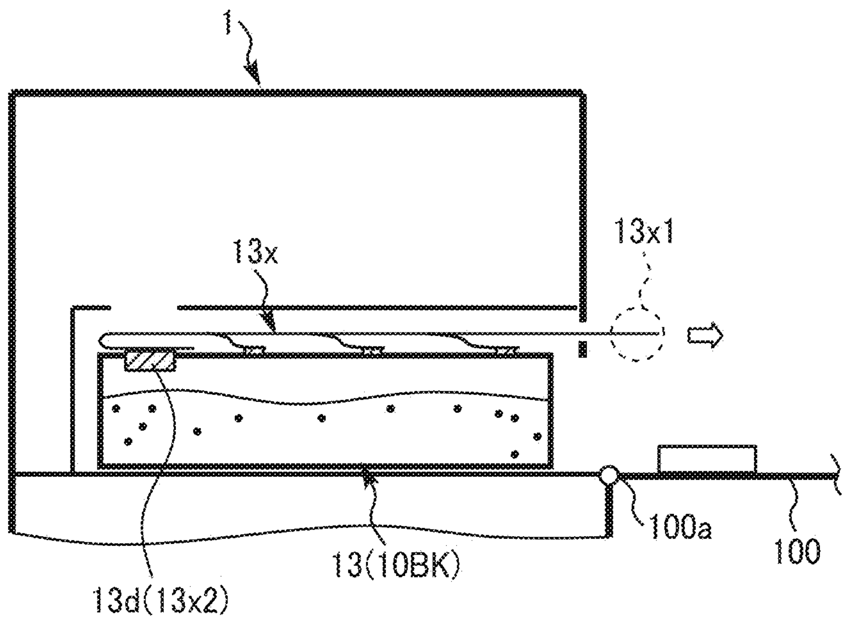

A description is given below in detail of a characteristic configuration and operation of the process cartridge 10BK as the removable unit in the present embodiment with reference to FIGS. 4A to 7. With reference to FIGS. 4A and 4B, the process cartridge 10BK in the present embodiment functions as a removable unit detachably attached in the body of the image forming apparatus 1. The process cartridge 10BK (removable unit) is installed inside the body of the image forming apparatus 1 (at an installation position where an image forming process is performed) in a state where the developer is stored (preset) in the developing device 13 in advance at the time of shipment from a factory.

Figure 5:
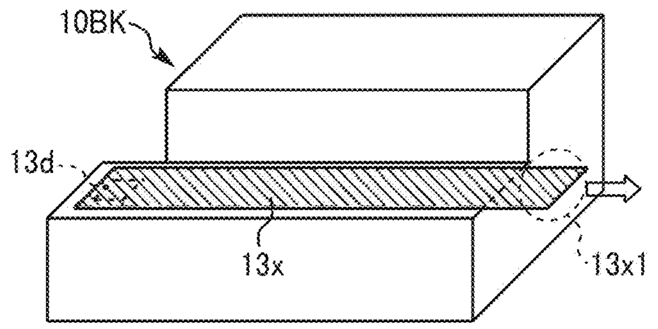
FIG. 5 is a perspective view of a process cartridge at the time of shipment.

As described above with reference to FIGS. 2 and 3, the developing device 13 of the process cartridge 10BK has the toner supply inlet 13*d* as an opening portion for appropriately supplying toner from the toner container 28 into the developing device 13. Accordingly, if the developing device 13 is set in the image forming apparatus 1 and shipped from a factory with the toner supply inlet 13*d* (opening portion) remaining open, the developer preset in the developing device 13 may leak from the toner supply inlet 13*d* due to vibration during transportation. Accordingly, in the present embodiment, as illustrated in FIGS. 4 and 5, the toner supply inlet 13*d* (opening portion) of the developing device 13 (process cartridge 10BK) is sealed as a sealed portion by a sheet-shaped sealing member 13*x* at the time of shipment from a factory. Such a configuration prevents inconveniences that the developer preset in the developing device 13 of the image forming apparatus 1 shipped from a factory scatters in the image forming apparatus 1 during transportation.

The sheet-shaped sealing member 13*x* is detachably attached to the process cartridge 10BK (removable unit). When the process cartridge 10BK (developing device 13) is started to be used in the image forming apparatus 1 delivered to a user, the sheet-shaped sealing member 13*x* is pulled out (removed) from the process cartridge 10BK in the direction of the white arrow by an operator such as the user or a service person, with the longitudinal direction (the left-and-right direction in FIGS. 4A and 4B) as a pull-out direction.

Specifically, as illustrated in FIGS. 4A and 4B, the body of the image forming apparatus 1 includes an opening-and-closing cover 100 that is openable and closable for attachment and detachment of the process cartridge 10BK (removable unit). The opening-and-closing cover 100 is rotated around a support shaft 100*a* in the clockwise direction in FIGS. 4A and 4B to open the inside of the image forming apparatus 1. The opening-and-closing cover 100 is rotated around the support shaft 100*a* in the counterclockwise direction in FIGS. 4A and 4B to close the inside of the image forming apparatus 1. The process cartridge 10BK is attached to the image forming apparatus 1 from the right side to the left side in FIG. 4 and is pulled out in the opposite direction. On the other hand, the sheet-shaped sealing member 13*x* installed in the process cartridge 10BK (developing device 13) at the time of shipment from a factory has a grip portion 13*x*1 that can be gripped and pulled out by an operator on the front side in the pull-out direction (the right side in FIG. 4). As illustrated in FIG. 4A, in the process cartridge 10BK set in the image forming apparatus 1 at the time of shipment from a factory, the grip portion 13*x*1 is exposed to be pulled out to the outside of the body of the image forming apparatus 1 via an opening formed in the opening-and-closing cover 100 in a state where the opening-and-closing cover 100 is closed. When an operator starts using the process cartridge 10BK in the image forming apparatus 1 after the arrival of the image forming apparatus 1, the operator pulls out the sheet-shaped sealing member 13*x* in the direction of the white arrow in FIG. 4A to open the toner supply inlet 13*d* in the sealed state. With such a configuration, an operator can pull out and remove the sheet-shaped sealing member 13*x* without taking out the process cartridge 10BK from the body of the image forming apparatus 1. As illustrated in FIG. 4B, the grip portion 13*x*1 may be exposed to the outside of the body of the image forming apparatus 1 in a state where the opening-and-closing cover 100 is opened so that the grip portion 13*x*1 can be pulled out from the body of the image forming apparatus 1. In such a case, when the operator starts using the process cartridge 10BK in the image forming apparatus 1 after the arrival of the image forming apparatus 1, the operator opens the opening-and-closing cover 100 and grips the grip portion 13*x*1 to pull out the sheet-shaped sealing member 13*x* in the direction of the white arrow in FIG. 4B to open the toner supply inlet 13*d* in the sealed state.

Figure 6:
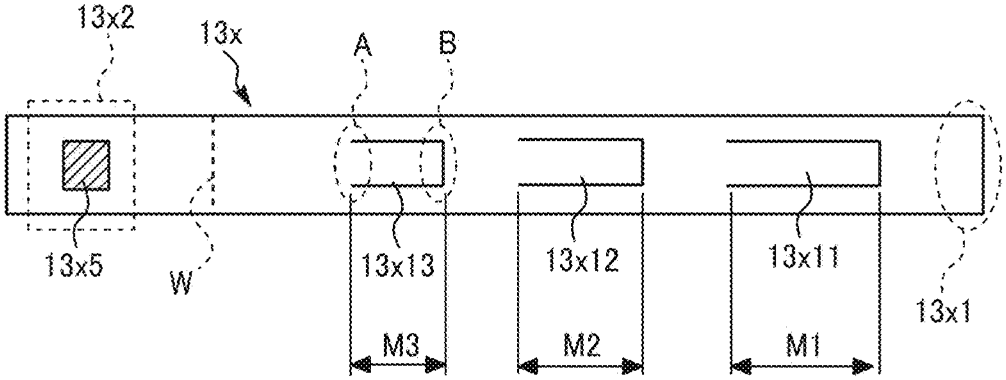
FIG. 6 is a top view of a sheet-shaped sealing member.
Figure 7:
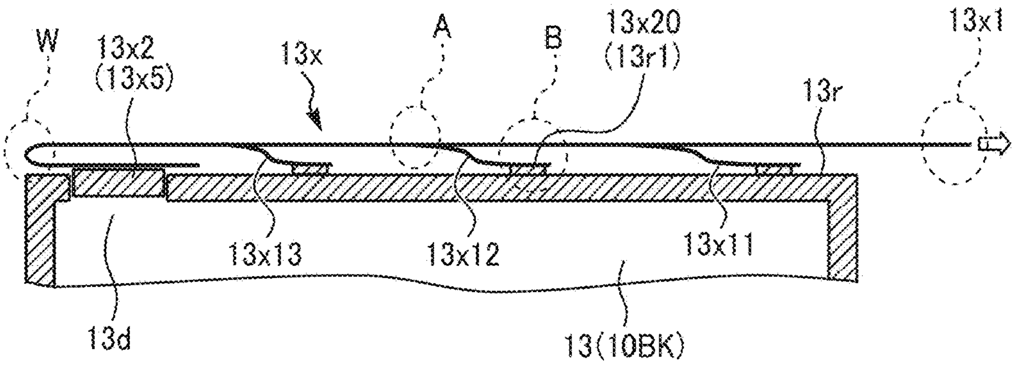
FIG. 7 is a sectional view of a process cartridge (a developing device) to which a sheet-shaped sealing member is adhered.

As described above, the sheet-shaped sealing member 13*x* in the present embodiment is formed to be pulled out from the front side in the pull-out direction (right side in FIGS. 4A and 4B) with the longitudinal direction (left-and-right direction in FIGS. 4A and 4B) as the pull-out direction. With reference to FIGS. 6 and 7, the sheet-shaped sealing member 13*x* is a sheet-shaped member made of a urethane sheet having a substantially rectangular main portion. In addition to the above-described grip portion 13*x*1, for example, a sealing portion 13*x*2 and cutout portions 13*x*11, 13*x*12, and 13*x*13 are formed. As described above, the grip portion 13*x*1 is formed on the front side in the pull-out direction (the right side in FIGS. 4A, 4B, 6, and 7) so that an operator can grip and pull out the grip portion 13*x*1.

With reference to FIGS. 6 and 7, the sealing portion 13*x*2 is for sealing the toner supply inlet 13*d* (an opening portion for allowing toner as powder to flow in) as the sealed portion. Specifically, the sealing portion 13*x*2 includes an elastic member 13*x*5 to be press-fitted into the toner supply inlet 13*d* (opening portion). As the elastic member 13*x*5, a columnar member made of an elastic material such as foamed polyurethane can be used, and the columnar member is pushed and fitted in the toner supply inlet 13*d* to seal the toner supply inlet 13*d*. The elastic member 13*x*5 is joined to the front surface of the sheet-shaped sealing member 13*x* (sealing portion 13*x*2) via, for example, a double-sided tape.

In the present embodiment, the toner supply inlet 13*d* is positioned on the rear side of the image forming apparatus 1 (the downstream side in the installation direction of the process cartridge 10BK and the side corresponding to the rear side in the pull-out direction of the sheet-shaped sealing member 13*x*). Accordingly, the sheet-shaped sealing member 13*x* is preferably formed such that the sealing portion 13*x*2 is disposed at a position corresponding to the rear side of the image forming apparatus 1, and the length of the sheet-shaped sealing member 13*x* (the length from the grip portion 13*x*1 to the sealing portion 13*x*2) is long in the longitudinal direction (the pull-out direction). As illustrated in FIG. 7, the elastic member 13*x*5 of the sealing portion 13*x*2 is fitted into the toner supply inlet 13*d* in a state where the sheet-shaped sealing member 13*x* is folded back at a folding portion W on the rear side in the pull-out direction. Such a sealing method is adopted so that the assembly of the sheet-shaped sealing member 13*x* becomes relatively simple.

With reference to FIGS. 6 and 7, each of the cutout portions 13*x*11, 13*x*12, and 13*x*13 is cut out to be cantilevered with a position different from the sealing portion 13*x*2 as a root portion A. Specifically, the cutout portions 13*x*11, 13*x*12, and 13*x*13 are formed between the sealing portion 13*x*2 and the grip portion 13*x*1 in the pull-out direction. In particular, a plurality of cutout portions (three cutout portions 13*x*11, 13*x*12, and 13*x*13 in the present embodiment) are formed at intervals in the pull-out direction. Each of the three cutout portions 13*x*11, 13*x*12, and 13*x*13 is formed in a substantially U-shape (substantially strip-shape) with the root portion A extending linearly in a direction (lateral direction) orthogonal to the pull-out direction (longitudinal direction) as a starting point.

The free end of each of the cutout portions 13*x*11, 13*x*12, and 13*x*13 is removably fixed as a fixing portion B to a fixed portion 13*r*1 of a housing (a developing case 13*r* of the developing device 13 which is a part of the process cartridge 10BK) in which the toner supply inlet 13*d* (sealed portion) and the sheet-shaped sealing member 13*x* are installed. Specifically, the fixing portion B of each of the cutout portions 13*x*11, 13*x*12, and 13*x*13 includes a double-sided tape 13*x*20 on a surface opposite the fixed portion 13*r*1 of the developing case 13*r*. One side of the double-sided tape 13*x*20 is adhered to the fixing portion B and the other side of the double-sided tape 13*x*20 is adhered to the fixing portion 13*r*1, and thus the fixing portion B is fixed to the fixed portion 13*r*1. As illustrated in FIG. 7, the fixing portion B is fixed to the developing case 13*r* in a state where each of the cutout portions 13*x*11, 13*x*12, and 13*x*13 is bent at the root portion A. The strength (adhesive strength) with which each of the cutout portions 13*x*11, 13*x*12, and 13*x*13 (fixing portion B) is fixed to the fixed portion 13*r*1 is such that each of the cutout portions 13*x*11, 13*x*12, and 13*x*13 is relatively easily separated from the fixed portion 13*r*1 when an operator grips and pulls out the grip portion 13*x*1 and is such that each of the cutout portions 13*x*11, 13*x*12, and 13*x*13 is not easily separated even when the environmental condition such as temperature and humidity changes during transportation.

As described above, the sheet-shaped sealing member 13*x* in the present embodiment has the cutout portions 13*x*11, 13*x*12, and 13*x*13 fixed to the housing of the developing device 13 (process cartridge 10BK), and thus, operability at the time of pulling out and assemblability at the time of assembling can be enhanced. Specifically, in a case where the cutout portions 13*x*11, 13*x*12, and 13*x*13 are not provided, when the sheet-shaped sealing member 13*x* installed in the developing device 13 (process cartridge 10BK) is pulled out, the position of the sheet-shaped sealing member 13*x* is not determined for a reason such as the shift of the sheet-shaped sealing member 13*x* in the lateral direction orthogonal to the pull-out direction. Thus, the sheet-shaped sealing member 13*x* may be difficult to pull or may be hooked on another member in an adjacent device to be broken. In such a case, the developing device 13 (process cartridge 10BK) may not be normally started to be used. In addition, in a case where the cutout portions 13*x*11, 13*x*12, and 13*x*13 are not provided, when an operator assembles the sheet-shaped sealing member 13*x* to the developing device 13 (process cartridge 10BK)) before shipment in a manufacturing plant, the position of the sheet-shaped sealing member 13*x* in the lateral direction or the longitudinal direction is not determined, and the sheet-shaped sealing member 13*x* is assembled in a state where floating or loosening occurs. In such a case, toner may leak from the toner supply inlet 13*d* of the developing device 13 (process cartridge 10BK) during transportation after shipment from a factory, or the operability during the pull-out operation after arrival may be deteriorated. In particular, the inconveniences may not be negligible in the sheet-shaped sealing member 13*x* whose length in the pull-out direction from the sealing portion 13*x*2 to the grip portion 13*x*1 is long. On the other hand, the sheet-shaped sealing member 13*x* in the present embodiment has the cutout portions 13*x*11, 13*x*12, and 13*x*13 fixed to the housing of the developing device 13 (process cartridge 10BK), and thus the occurrence of the above-described inconveniences can be reduced. In the present embodiment, three cutout portions 13*x*11, 13*x*12, and 13*x*13 are formed in the sheet-shaped sealing member 13*x*. However, the number of cutout portions is not limited thereto, and can be an optimal number according to the length in the pull-out direction.

With reference to FIG. 7, in the cutout portions 13*x*11, 13*x*12, and 13*x*13, the root portion A is positioned on the rear side in the pull-out direction (the left side in FIG. 7), and the fixing portion B is positioned on the front side in the pull-out direction (the right side in FIG. 7). With such a configuration, when an operator pulls out the sheet-shaped sealing member 13*x*, the sheet-shaped sealing member 13*x* receives the repulsive force on the separation of the sealing portion 13*x*2 from the toner supply inlet 13*d*, and then receives the repulsive force on the separation of the fixing portion B from the fixed portion 13*r*1 at a different timing. Accordingly, the operability at the time of the pull-out operation can be enhanced as compared with the case where the above-described repulsive forces are received at the same timing.

In the present embodiment, the plurality of cutout portions 13x11, 13x12, and 13x13 are formed such that the length M from the root portion A to the fixing portion B of each cutout portion on the front side in the pull-out direction (the right side in FIGS. 6 and 7) is longer than the length M from the root portion A to the fixing portion B of each cutout portion on the rear side in the pull-out direction (the left side in FIGS. 6 and 7). Specifically, a length M1 of the first cutout portion 13x11 positioned closest to the grip portion 13x1 is the longest, a length M2 of the second cutout portion 13x12 positioned at the center of the sheet-shaped sealing member 13x is medium, and a length M3 of the third cutout portion 13x13 positioned closest to the sealing portion 13x2 is the shortest (M1>M2>M3). With such a configuration, when an operator pulls out the sheet-shaped sealing member 13x, the sheet-shaped sealing member 13x receives the repulsive force on the separation of the sealing portion 13x2 from the toner supply inlet 13d. After that, at a different timing, the sheet-shaped sealing member 13x receives the repulsive force on the separation of the fixing portion B of the third cutout portion 13x13 from the fixed portion 13r1, then receives the repulsive force on the separation of the fixing portion B of the second cutout portion 13x12 from the fixed portion 13r1, and finally receives the repulsive force on the separation of the fixing portion B of the first cutout portion 13x11 from the fixed portion 13r1. Accordingly, the operability at the time of the pull-out operation can be enhanced as compared with the case where the above-described repulsive forces are received at the same timing. In particular, the sheet-shaped sealing member 13x receives the repulsive forces in order from the repulsive force on the rear side in the pull-out direction (the side closer to the sealing portion 13x2) to the repulsive force on the front side, and thus a smooth pull-out feeling is generated.

The sheet-shaped sealing member 13x in the present embodiment is formed such that the adhesive force of the double-sided tape 13x20 to the fixed portion 13r1 of the developing case 13r is smaller than the adhesive force of the double-sided tape 13x20 to the fixing portion B. Such a configuration can reduce inconveniences that the adhesive of the double-sided tape 13x20 remains on the fixed portion 13r1 when an operator pulls out the sheet-shaped sealing member 13x. Further, the pull-out operability is also enhanced.

In the present embodiment, the sealing portion 13x2 is formed on a surface (upper surface in FIG. 7) of the sheet-shaped sealing member 13x opposite the surface (lower surface in FIG. 7) on which the cutout portions 13x11, 13x12, and 13x13 are bent around the root portions A. In other words, as illustrated in FIG. 7, the sheet-shaped sealing member 13x is folded at a folded portion W on the rear side in the pull-out direction, and then the elastic member 13x5 of the sealing portion 13x2 is fitted into the toner supply inlet 13d. When an operator pulls out the sheet-shaped sealing member 13x, such a configuration can prevent toner from adhering to the surface of the developing case 13r due to the sealing portion 13x2 (elastic member 13x5) contaminated with the toner.

First Modification

Figure 8A:
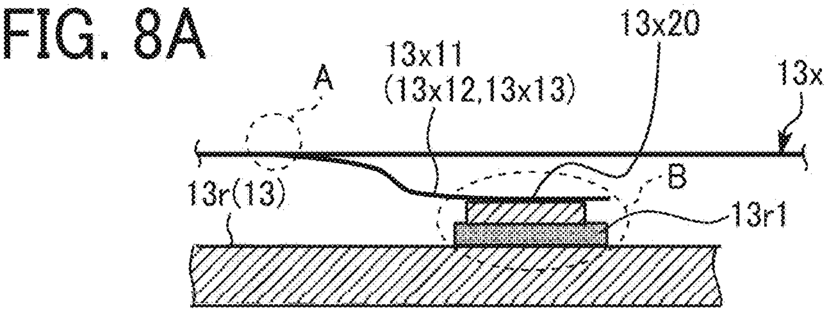
FIG. 8A is an enlarged view of a developing device to which a sheet-shaped sealing member is adhered according to a first modification.
Figure 8B:
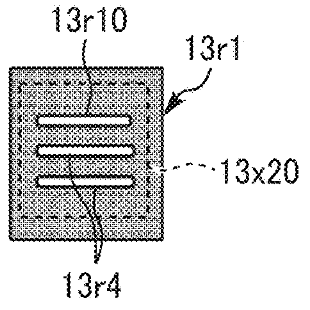
FIG. 8B is a top view of an adhered portion according to the first modification.

As illustrated in FIG. 8A, the sheet-shaped sealing member 13x in the first modification is also provided with a double-sided tape 13x20 on a surface of the fixing portion B facing the fixed portion 13r1 of the developing case 13r. In the first modification, as illustrated in FIG. 8B, the surface (to which the fixing portion B is adhered) of the fixed portion 13r1 of the developer case 13r has a concave-and-convex portion. The sheet-shaped sealing member 13x is adhered to the fixed portion 13r1 on which the concave-and-convex portion is formed via the double-sided tape 13x20. Specifically, the fixed portion 13r1 is formed to protrude upward from the front surface of the developing case 13r, and a plurality of recessed portions 13r10 (groove portions) are formed in the fixed portion 13r1. With such a configuration, the contact area between the fixed portion 13r1 and the double-sided tape 13x20 is reduced. Thus, even if there is no difference in the adhesive force between the front surface (the side of the fixing portion B) and the back surface (the side of the fixed portion 13r1) of the double-sided tape 13x20, the adhesive force of the double-sided tape 13x20 to the fixed portion 13r1 can be smaller than the adhesive force of the double-sided tape 13x20 to the fixing portion B. Such a configuration can reduce inconveniences that the adhesive of the double-sided tape 13x20 remains on the fixed portion 13r1 when an operator pulls out the sheet-shaped sealing member 13x. Further, the pull-out operability is also enhanced. In particular, in the example of FIGS. 8A and 8B, a plurality of recessed portions 13r10 (groove portions) are formed in the fixed portion 13r1 at intervals in the lateral direction to extend along the pull-out direction (longitudinal direction). Accordingly, the sheet-shaped sealing member 13x is relatively strong against the force acting in the lateral direction, and the repulsive force that an operator receives in the pull-out direction is weakened. As a result, a preferable pull-out operability of the sheet-shaped sealing member 13x can be obtained while the function of determining the position in the lateral direction is maintained.

Second Modification

Figure 9A:
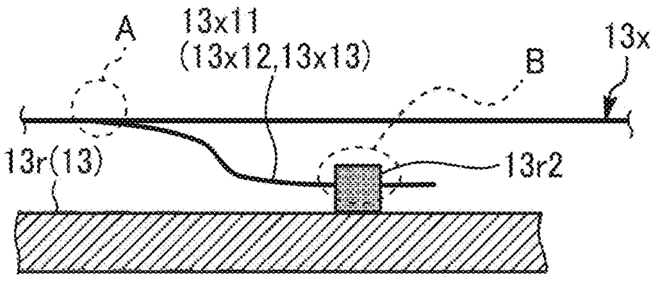
FIG. 9A is an enlarged view of a developing device to which a sheet-shaped sealing member is adhered according to a second modification.
Figure 9B:
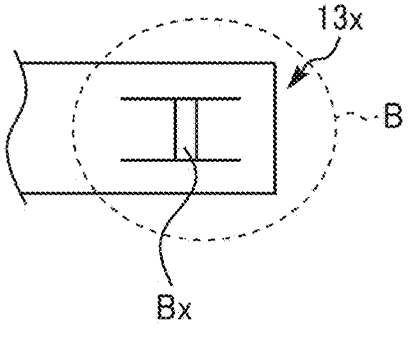
FIG. 9B is a top view of an adhered portion according to the second modification.

As illustrated in FIG. 9A, in the second modification, a fixed portion 13r2 of the developing case 13r is formed in a projection shape (boss shape) to protrude upward from the front face of the developing case 13r. As illustrated in FIG. 9B, the fixing portion B of the sheet-shaped sealing member 13x has a slit Bx that can be fitted to the fixed portion 13r2 having a projection shape. In other words, as illustrated in FIG. 9A, the slit Bx of the fixing portion B is fitted into the fixed portion 13r2, and thus the fixing portion B is fixed to the fixed portion 13r2. Even in a case of such a configuration, the operability at the time of pulling out and the assemblability at the time of assembling can be enhanced in the sheet-shaped sealing member 13x. In particular, according to the configuration of the second modification, the double-sided tape 13x20 does not need to be disposed on the fixing portion B. Thus, the fixing portion B can be relatively easily fixed to the fixed portion 13r1.

Third Modification

Figure 10:
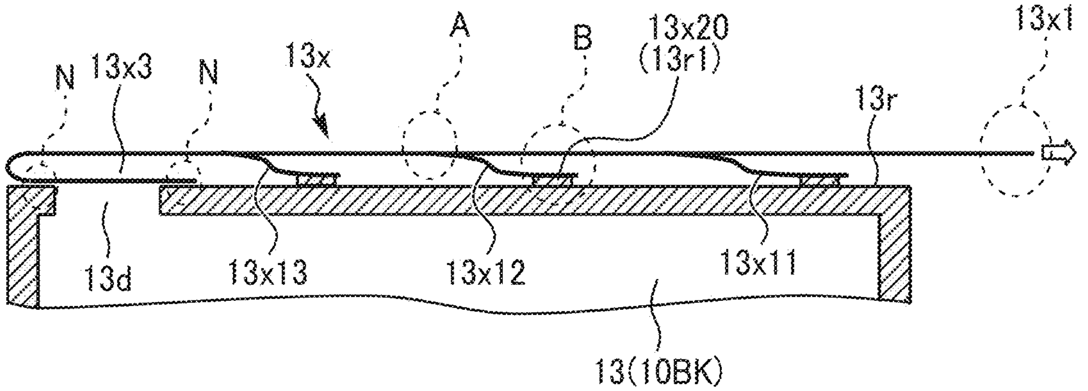
FIG. 10 is a sectional view of a process cartridge to which a sheet-shaped sealing member is adhered according to a third modification.

As illustrated in FIG. 10, in the sheet-shaped sealing member 13x according to the configuration of the third modification, the sealing portion 13x2 is thermally welded to an edge portion N around the toner supply inlet 13d (opening portion). In other words, in the third modification, the elastic member 13x5 is not disposed on the sealing portion 13x2, but the surface of the sheet-shaped sealing member 13x is directly thermally welded to the edge portion N of the toner supply inlet 13d to seal the toner supply inlet 13d. Even in a case of such a configuration, the operability at the time of pulling out and the assemblability at the time of assembling can be enhanced in the sheet-shaped sealing member 13x. In particular, according to the configuration of the third modification, the repulsive force at the time of pulling out can be relatively small.

Fourth Modification

Figure 11:
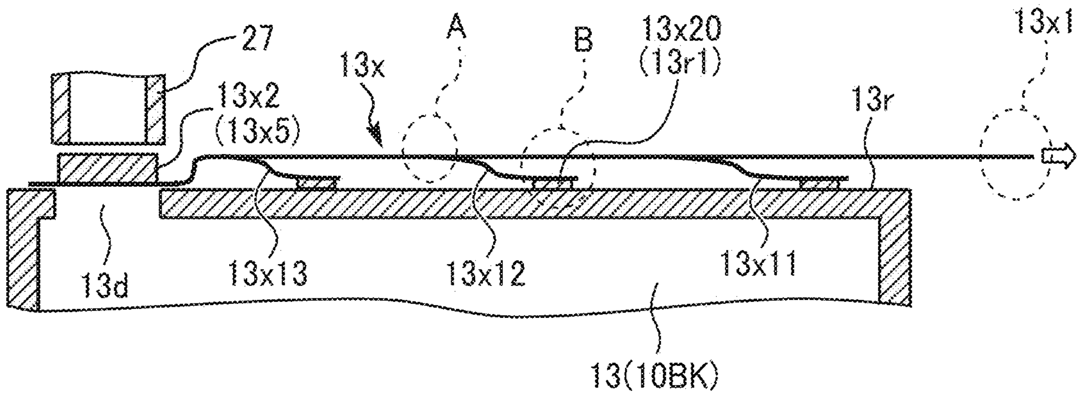
FIG. 11 is a sectional view of a process cartridge to which a sheet-shaped sealing member is adhered according to a fourth modification.

As illustrated in FIG. 11, the sheet-shaped sealing member 13*x* in the fourth modification is formed to seal the toner discharge port 27 (an opening portion for discharging toner (powder) toward the toner supply inlet 13*d*) as a sealed portion of the toner supply passage by the sealing portion 13*x*2 (elastic member 13*x*5). Accordingly, in the sheet-shaped sealing member 13*x* in the fourth modification, the fixing portion B of each of the cutout portions 13*x*11, 13*x*12, and 13*x*13 is removably fixed to the fixed portion 13*r*1 of the housing (developing case 13*r*) in which the sheet-shaped sealing member 13*x* is installed, and seals the toner discharge port 27 of the toner supply passage installed in the body of the image forming apparatus 1. When the image forming apparatus 1 is started to be used after the arrival of the image forming apparatus 1, the sheet-shaped sealing member 13*x* is pulled out by an operator. Thus, the toner discharge port 27 and the toner supply inlet 13*d* communicate with each other, so that the image forming process can be executed. Even in a case of such a configuration, the operability at the time of pulling out and the assemblability at the time of assembling can be enhanced in the sheet-shaped sealing member 13*x*.

As described above, the sheet-shaped sealing member 13*x* in the present embodiment is a sheet-shaped sealing member that can be pulled out from the front side in the longitudinal direction as the pull-out direction, and has the sealing portion 13*x*2 that seals the toner supply inlet 13*d* (sealed portion) and the cutout portions 13*x*11, 13*x*12, and 13*x*13 that are cut out to be cantilevered with a position different from the sealing portion 13*x*2 as the root portion A. Each of the free end of the cutout portions 13*x*11, 13*x*12, and 13*x*13 is detachably fixed as the fixing portion B to the fixed portion 13*r*1 of the developing case 13*r* (housing) on which the toner supply inlet 13*d* or the sheet-shaped sealing member 13*x* is installed. With such a configuration, the operability at the time of pulling out is high, and the assemblability at the time of assembling is also high.

In the present embodiment, the sheet-shaped sealing member 13*x* is detachably installed on the process cartridge 10BK including the photoconductor drum 11 (image bearer), the developing device 13, the charging device 12, and the cleaning device 15. However, the sheet-shaped sealing member 13*x* to which the present disclosure is applied is not limited to this, and the present disclosure can be applied to, for example, a sheet-shaped sealing member detachably installed in a removable unit detachably installed in the body of the image forming apparatus 1, for example, a developing unit (developing device 13) detachably installed as a single unit in the body of the image forming apparatus 1. The sheet-shaped sealing member of the present embodiment can be detachably installed not only in the removable unit but also in a device (e.g., the writing device 6) that is installed and fixed in the body of the image forming apparatus 1. Even in such a case, substantially the same effects as the effects in the present embodiment can be obtained. The term "process cartridge" used in the present disclosure is defined as a unit that unites an image bearer and at least one of a charging device to charge the image bearer, a developing device to develop a latent image on the image bearer, and a cleaning device to clean the image bearer and that is attachable to and removable from the body of the image forming apparatus.

Note that embodiments of the present disclosure are not limited to the above-described embodiments and it is apparent that the above-described embodiments can be appropriately modified within the scope of the technical idea of the present embodiment in addition to what is suggested in the above-described embodiments. Further, features of components of the embodiments, such as the number, the position, and the shape are not limited the embodiments and thus may be preferably set.

Aspects of the present disclosure may be, for example, combinations of first to twelfth aspects as follows.

First Aspect

A sheet-shaped sealing member (e.g., the sheet-shaped sealing member 13*x*) that can be pulled out from a front side of the sheet-shaped sealing member in a pull-out direction that is a longitudinal direction of the sheet-shaped sealing member. The sheet-shaped sealing member has a sealing portion (e.g., the sealing portion 13*x*2) and a cutout portion (e.g., the cutout portion 13*x*11, 13*x*12, 13*x*13). The sealing portion seals a sealed portion (e.g., the toner supply inlet 13*d*). The cutout portion is cut out to be cantilevered with a position different from the sealing portion as a root portion (e.g., the root portion A). The cutout portion has a free end as a fixing portion to be removably fixed to the sealed portion or a fixed portion (e.g., the fixed portion 13*r*1) of a housing (e.g., the developing case 13*r*) in which the sheet-shaped sealing member is installed.

Second Aspect

In the sheet-shaped sealing member (e.g., the sheet-shaped sealing member 13*x*) according to the first aspect further includes a grip portion (e.g., the grip portion 13*x*1) to be gripped and pulled out by an operator. The grip portion is on a front end of the sheet-shaped sealing member in the pull-out direction. The cutout portion (e.g., the cutout portion 13*x*11, 13*x*12, 13*x*13) is between the sealing portion (e.g., the sealing portion 13*x*2) and the grip portion in the pull-out direction of the sheet-shaped sealing member.

Third Aspect

In the sheet-shaped sealing member (e.g., the sheet-shaped sealing member 13*x*) according to the first or second aspect, the root portion (e.g., the root portion A) is on a rear side of the cutout portion (e.g., the cutout portion 13*x*11, 13*x*12, 13*x*13) in the pull-out direction, and the fixing portion (e.g., the fixing portion B) is on a front side of the cutout portion in the pull-out direction.

Fourth Aspect

The sheet-shaped sealing member (e.g., the sheet-shaped sealing member 13*x*) according to any one of the first to third aspects, further includes a plurality of cutout portions including the cutout portion (e.g., the cutout portion 13*x*11, 13*x*12, 13*x*13) arranged at an interval in the pull-out direction of the sheet-shaped sealing member. Among the plurality of cutout portions, a length between the root portion (e.g., the root portion A) and the fixing portion (e.g., the fixing portion B) of the cutout portion closer to the front side of the sheet-shaped sealing member in the pull-out direction is longer than a length between the root portion and the fixing portion of another cutout portion closer to a rear side of the sheet-shaped sealing member in the pull-out direction.

Fifth Aspect

In the sheet-shaped sealing member (e.g., the sheet-shaped sealing member 13*x*) according to any one of the first to fourth aspects, the fixing portion (e.g., the fixing portion B) is provided with a double-sided tape (e.g., the double-sided tape 13*x*20) on a surface to face the fixed portion (e.g., the fixed portion 13*r*1). An adhesive force of the double-sided tape to the fixed portion is smaller than an adhesive force of the double-sided tape to the fixing portion.

Sixth Aspect

In the sheet-shaped sealing member (e.g., the sheet-shaped sealing member 13*x*) according to any one of the first to fifth aspects, the fixing portion (e.g., the fixing portion B) is provided with a double-sided tape (e.g., the double-sided tape 13*x*20) on a surface to face the fixed portion (e.g., the fixed portion 13*r*1). The double-sided tape is to adhere the sheet-shaped sealing member to the fixed portion having a concave-and-convex portion.

Seventh Aspect

In the sheet-shaped sealing member (e.g., the sheet-shaped sealing member 13*x*) according to any one of the first to sixth aspects, the fixing portion (e.g., the fixing portion B) has a slit (e.g., the slit Bx) to be fitted to the fixed portion (e.g., the fixed portion 13*r*1) of a projection shape.

Eighth Aspect

In the sheet-shaped sealing member (e.g., the sheet-shaped sealing member 13*x*) according to any one of the first to seventh aspects, the sealed portion (e.g., the toner supply inlet 13*d*) is an opening portion to flow powder in and out. The sealing portion (e.g., the sealing portion 13*x*2) has an elastic member to press-fit into the opening portion.

Ninth Aspect

In the sheet-shaped sealing member (e.g., the sheet-shaped sealing member 13*x*) according to any one of the first to eighth aspects, the sealed portion (e.g., the toner supply inlet 13*d*) is an opening portion to flow powder in and out. The sealing portion (e.g., the sealing portion 13*x*2) is heat-welded to an edge portion (e.g., the edge portion N) around the opening portion.

Tenth Aspect

In the sheet-shaped sealing member (e.g., the sheet-shaped sealing member 13*x*) according to any one of the first to ninth aspects, the sealing portion (e.g., the sealing portion 13*x*2) is on a surface of the sheet-shaped sealing member opposite a surface on a side on which the cutout portion (e.g., the cutout portion 13*x*11, 13*x*12, 13*x*13) is bent around the root portion (e.g., the root portion A).

Eleventh Aspect

A removable unit (e.g., the process cartridge 10BK) is detachably attachable to a body of an image forming apparatus (e.g., the image forming apparatus 1). The sheet-shaped sealing member (e.g., the sheet-shaped sealing member 13*x*) according to any one of the first to tenth aspects is removably installed in the removable unit.

Twelfth Aspect

An image forming apparatus (e.g., the image forming apparatus 1) includes a body. The body of the image forming apparatus includes the removable unit (e.g., the process cartridge 10BK) according to the eleventh aspect and an opening-and-closing cover (e.g., the opening-and-closing cover 100). The removable unit is installed inside the body of the image forming apparatus. The opening-and-closing cover opens and closes for attachment and detachment of the removable unit to and from the body of the image forming apparatus. The sheet-shaped sealing member (e.g., the sheet-shaped sealing member 13*x*) includes a grip portion (e.g., the grip portion 13*x*1) on a front side in a pull-out direction. The grip portion can be gripped and pulled out by an operator. The grip portion is exposed to an outside of the body of the image forming apparatus to be pulled out in a state where the cover is closed or is exposed to the outside of the body of the image forming apparatus to be pulled out in a state where the cover is open.

Thirteenth Aspect

The sheet-shaped sealing member (e.g., the sheet-shaped sealing member 13*x*) includes a base, a cutout portion (e.g., the cutout portion 13*x*11, 13*x*12, 13*x*13), and a sealing portion (e.g., the sealing portion 13*x*2). The base has an elongated sheet shape. The cutout portion is disposed in the base and cut out to be cantilevered with one end in a longitudinal direction of the sheet-shaped sealing member as a root portion (e.g., the root portion A) and another end in the longitudinal direction as a free end, the cutout portion having a fixing portion (e.g., the fixing portion B) on one surface of the free end. The sealing portion is disposed on an end of the base opposite the free end in a longitudinal direction with respect to the root portion and on a surface of the base opposite a surface on which the fixing portion is disposed.

Fourteenth Aspect

The sheet-shaped sealing member (e.g., the sheet-shaped sealing member 13*x*) according to the thirteenth aspect further includes a plurality of cutout portions, including the cutout portion (e.g., the cutout portion 13*x*11, 13*x*12, 13*x*13), arranged in the longitudinal direction on the base. A direction from the root portion (e.g., the root portion A) toward the free end is same in each of the plurality of cutout portions.

Fifteenth Aspect

In the sheet-shaped sealing member (e.g., the sheet-shaped sealing member 13*x*) according to the thirteenth aspect further includes a grip portion (e.g., the grip portion 13*x*1) disposed another end of the base opposite the end on which the sealing portion (e.g., the sealing portion 13*x*2) is disposed in the longitudinal direction.

Sixteenth Aspect

In the sheet-shaped sealing member (e.g., the sheet-shaped sealing member 13*x*) according to the fourteenth aspect, among the plurality of cutout portions, a length from the root portion (e.g., the root portion A) to the fixing portion (e.g., the fixing portion B) in the longitudinal direction is longer in a cutout portion (e.g., the cutout portion 13$x$11, 13$x$12, 13$x$13) downstream in a direction from the sealing portion (e.g., the sealing portion 13$x$2) toward the plurality of cutout portions than in a cutout portion upstream in the direction from the sealing portion toward the plurality of cutout portions.

Seventeenth Aspect

A removable unit (e.g., the process cartridge 10BK) is detachably attachable to a body of an image forming apparatus (e.g., the image forming apparatus 1). The removable unit includes the sheet-shaped sealing member (e.g., the sheet-shaped sealing member 13$x$) according to the thirteenth aspect. The fixing portion (e.g., the fixing portion B) and the sealing portion (e.g., the sealing portion 13$x$2) of the sheet-shaped sealing member are removably installed in the removable unit.

Eighteenth Aspect

An image forming apparatus (e.g., the image forming apparatus 1) includes a body, the removable unit (e.g., the process cartridge 10BK) according to the seventeenth aspect, and an opening-and-closing cover (e.g., the opening-and-closing cover 100). The opening-and-closing cover opens and closes for attachment and detachment of the removable unit to and from the body of the image forming apparatus. The sheet-shaped sealing member (e.g., the sheet-shaped sealing member 13$x$) includes a grip portion (e.g., the grip portion 13$x$1) on a front side in a pull-out direction. The grip portion is exposed to an outside of the body of the image forming apparatus to be pulled out in a state where the cover is closed or is exposed to the outside of the body of the image forming apparatus to be pulled out in a state where the cover is open.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A sheet-shaped sealing member to be pulled out from a front side of the sheet-shaped sealing member in a pull-out direction that is a longitudinal direction of the sheet-shaped sealing member, the sheet-shaped sealing member comprising:

a sealing portion to seal a sealed portion; and a cutout portion cut out to be cantilevered with a position different from the sealing portion as a root portion, wherein the cutout portion has a free end as a fixing portion to be removably fixed to the sealed portion or a fixed portion of a housing in which the sheet-shaped sealing member is installed.

2. The sheet-shaped sealing member according to claim 1, further comprising a grip portion to be gripped and pulled out by an operator, wherein the grip portion is on a front end of the sheet-shaped sealing member in the pull-out direction, and wherein the cutout portion is between the sealing portion and the grip portion in the pull-out direction.

3. The sheet-shaped sealing member according to claim 1, wherein the root portion is on a rear side of the cutout portion in the pull-out direction, and the fixing portion is on a front side of the cutout portion in the pull-out direction.

4. The sheet-shaped sealing member according to claim 1, further comprising a plurality of cutout portions including the cutout portion arranged at an interval in the pull-out direction, wherein, among the plurality of cutout portions, a length between the root portion and the fixing portion of a cutout portion closer to the front side of the sheet-shaped sealing member in the pull-out direction is longer than a length between the root portion and the fixing portion of another cutout portion closer to a rear side of the sheet-shaped sealing member in the pull-out direction.

5. The sheet-shaped sealing member according to claim 1, wherein the fixing portion is provided with a double-sided tape on a surface to face the fixed portion, and wherein an adhesive force of the double-sided tape to the fixed portion is smaller than an adhesive force of the double-sided tape to the fixing portion.

6. The sheet-shaped sealing member according to claim 1, wherein the fixing portion is provided with a double-sided tape on a surface to face the fixed portion, and wherein the double-sided tape is to adhere the sheet-shaped sealing member to the fixed portion having a concave-and-convex portion.

7. The sheet-shaped sealing member according to claim 1, wherein the fixing portion has a slit to be fitted to the fixed portion of a projection shape.

8. The sheet-shaped sealing member according to claim 1, wherein the sealing portion has an elastic member to press-fit into the sealed portion.

9. The sheet-shaped sealing member according to claim 1, wherein the sealing portion is on a surface of the sheet-shaped sealing member opposite a surface on a side on which the cutout portion is bent around the root portion.

10. A removable unit detachably attachable to a body of an image forming apparatus, the removable unit comprising:

the housing; and the sheet-shaped sealing member according to claim 1 removably installed in the housing.

11. The removal unit according to claim 10, wherein the sealed portion is an opening portion to flow powder in and out, and wherein the sealing portion has an elastic member to press-fit into the opening portion.

12. The removal unit according to claim 10, wherein the sealed portion is an opening portion to flow powder in and out, and wherein the sealing portion is heat-welded to an edge portion around the opening portion.

13. An image forming apparatus, comprising a body, the body including:

the removable unit according to claim 10; and a cover to open and close for attachment and detachment of the removable unit to and from the body, wherein the sheet-shaped sealing member includes a grip portion on a front side in a pull-out direction, and wherein the grip portion is exposed to an outside of the body of the image forming apparatus to be pulled out in a state where the cover is closed or is exposed to the outside of the body of the image forming apparatus to be pulled out in a state where the cover is open.

14. A sheet-shaped sealing member comprising:

a base having an elongated sheet shape;

a cutout portion disposed on the base and cut out to be cantilevered with one end in a longitudinal direction of the sheet-shaped sealing member as a root portion and another end in the longitudinal direction as a free end, the cutout portion having a fixing portion on one surface of the free end; and a sealing portion disposed on an end of the base opposite the free end in the longitudinal direction with respect to the root portion.

15. The sheet-shaped sealing member according to claim 14, further comprising a plurality of cutout portions, including the cutout portion, arranged in the longitudinal direction on the base, wherein a direction from the root portion toward the free end is same in each of the plurality of cutout portions.

16. The sheet-shaped sealing member according to claim 15, wherein, among the plurality of cutout portions, a length from the root portion to the fixing portion in the longitudinal direction is longer in a cutout portion downstream in a direction from the sealing portion toward the plurality of cutout portions than in a cutout portion upstream in the direction from the sealing portion toward the plurality of cutout portions.

17. The sheet-shaped sealing member according to claim 14, further comprising a grip portion disposed on another end of the base opposite the end on which the sealing portion is disposed in the longitudinal direction.

18. A removable unit detachably attachable to a body of an image forming apparatus, the removable unit comprising the sheet-shaped sealing member according to claim 14, wherein the fixing portion and the sealing portion are removably installed.

19. An image forming apparatus comprising:

a body;

the removable unit according to claim 18; and a cover to open and close for attachment and detachment of the removable unit to and from the body, wherein the sheet-shaped sealing member includes a grip portion on a front side in a pull-out direction, and wherein the grip portion is exposed to an outside of the body of the image forming apparatus to be pulled out in a state where the cover is closed or is exposed to the outside of the body of the image forming apparatus to be pulled out in a state where the cover is open.

* * * * *